United States Patent [19]

Keyes

[11] 4,208,921
[45] Jun. 24, 1980

[54] FLYWHEEL ENERGY ACCUMULATOR

[76] Inventor: John H. Keyes, P.O. Box 474, Nederland, Colo. 80466

[21] Appl. No.: 786,544

[22] Filed: Apr. 11, 1977

[51] Int. Cl.² ............................................. G05G 1/00
[52] U.S. Cl. ...................................................... 74/572
[58] Field of Search ................... 192/104 B; 74/5.22, 74/572; 180/1 R

[56] References Cited

U.S. PATENT DOCUMENTS

| | | | |
|---|---|---|---|
| 1,240,551 | 9/1917 | Farrell | 74/710 X |
| 1,391,293 | 9/1921 | Balough | 74/572 X |
| 1,505,080 | 8/1924 | Shishkoff | 74/572 |
| 1,846,578 | 2/1932 | Bates | 192/104 B |
| 2,044,183 | 6/1936 | Peters | 180/1 R |
| 2,911,962 | 11/1959 | McRae | 192/104 B X |
| 3,124,007 | 3/1964 | Swinney | 74/5.22 |
| 3,145,797 | 8/1964 | Taylor | 74/5.22 X |
| 3,863,510 | 2/1975 | Benson | 180/1 R X |

FOREIGN PATENT DOCUMENTS

| | | | |
|---|---|---|---|
| 2450275 | 4/1976 | Fed. Rep. of Germany | 74/572 |
| 831992 | 9/1938 | France | 74/572 |
| 539576 | 2/1956 | Italy | 74/572 |
| 1445014 | 8/1976 | United Kingdom | 74/572 |

Primary Examiner—Samuel Scott
Assistant Examiner—Wesley S. Ratliff, Jr.
Attorney, Agent, or Firm—Gary M. Polumbus; John R. Ley

[57] ABSTRACT

Radial and axial bearings support an axle shaft attached to a flywheel apparatus to provide rotational support and limit axial movement during rotation of the flywheel. A cage generally surrounding the flywheel and receiving the flywheel within its hollow interior includes a cylindrically shaped side wall positioned adjacent to and concentric with the outside surface of the flywheel to rapidly absorb energy should distortion or shattering of the flywheel occur due to centrifugal force. Means for connecting the flywheel cage to a source of vacuum such as the intake manifold of a thermal engine is utilized to at least partially evacuate the interior of the flywheel cage and thereby increase the ability of the rotating flywheel to store and maintain kinetic energy. A plurality of lubricant passages and reservoirs supply lubricant to the bearings associated with the axle shaft of the flywheel.

12 Claims, 7 Drawing Figures

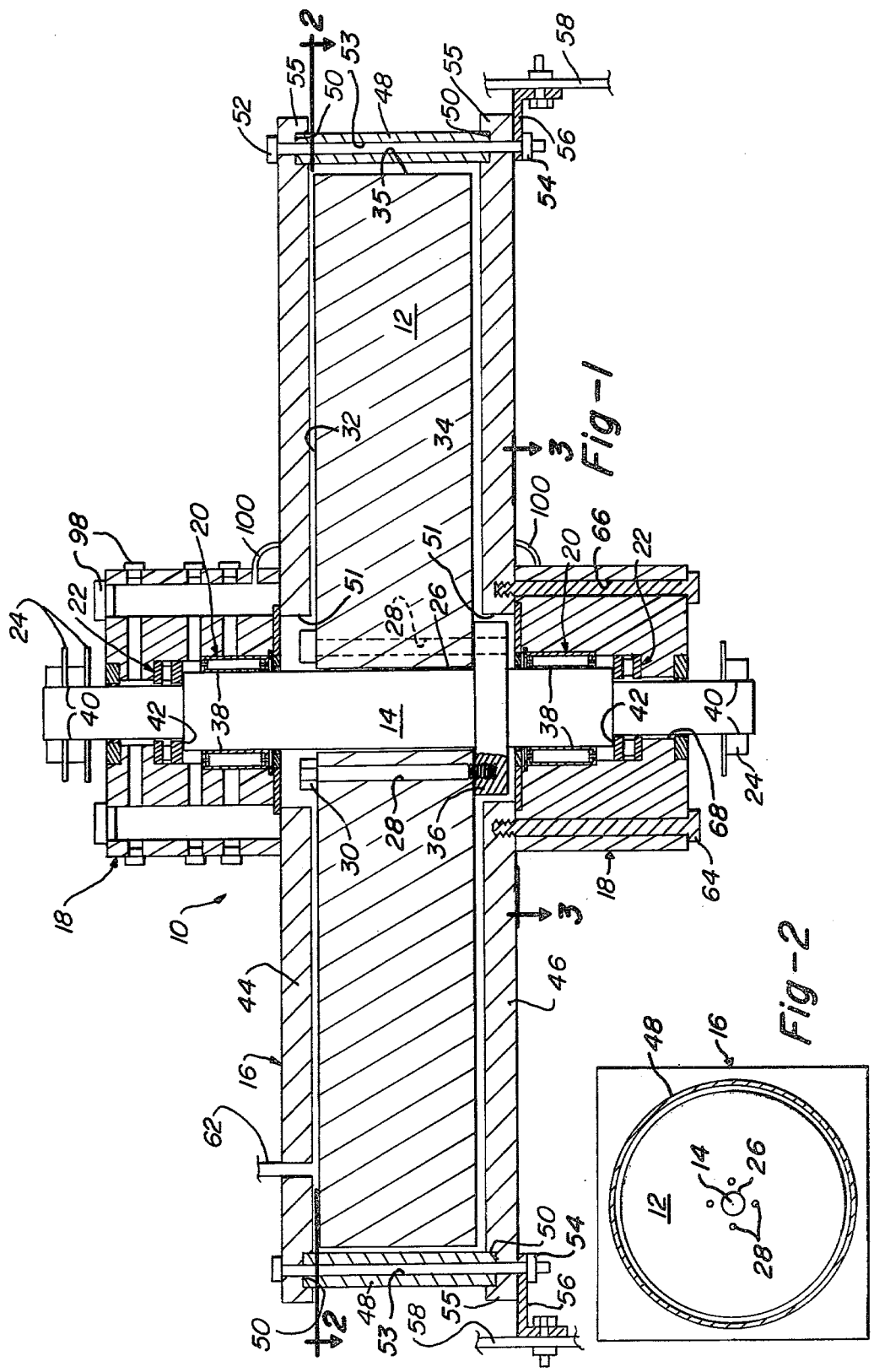

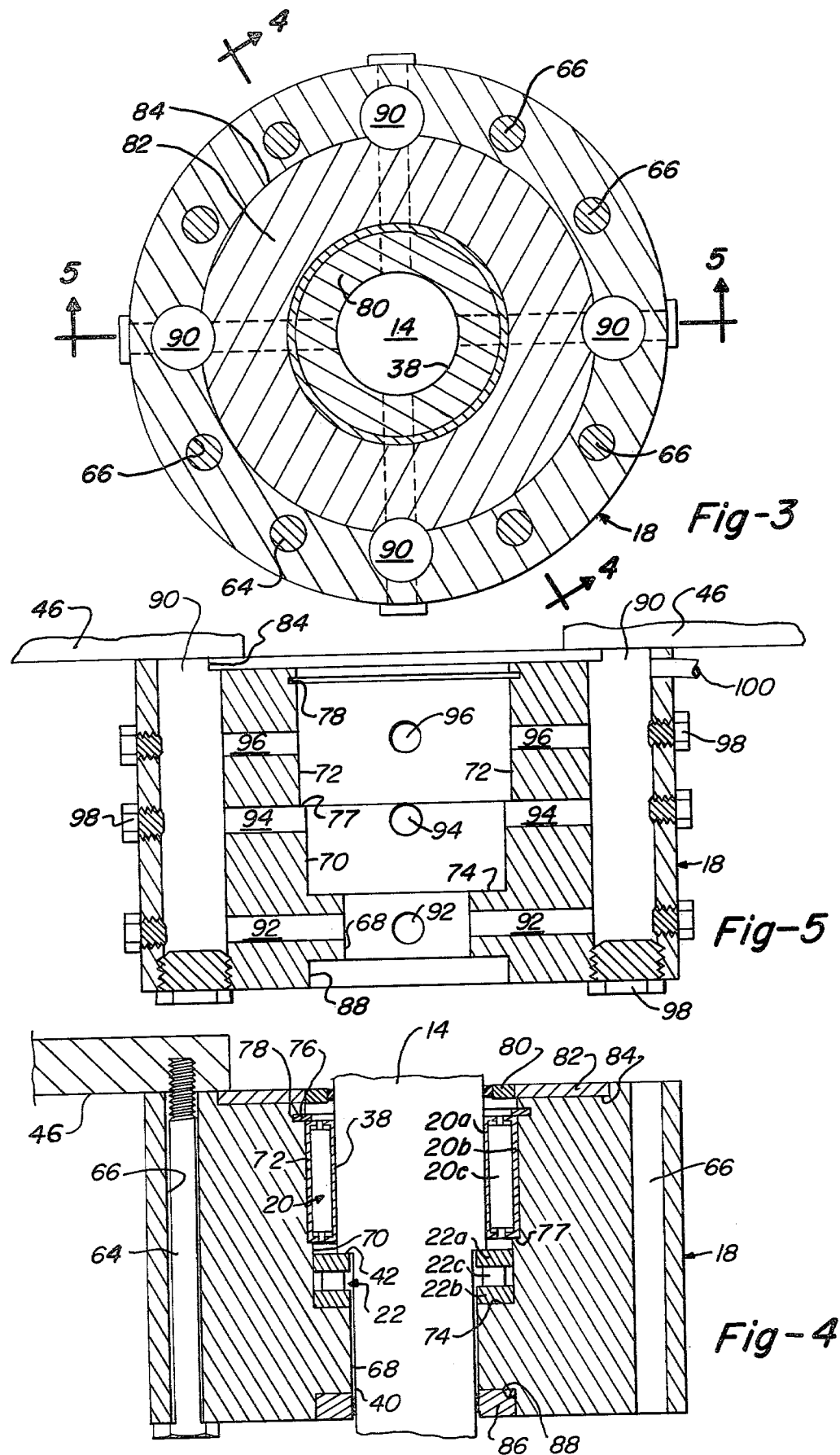

FLYWHEEL ENERGY ACCUMULATOR

BACKGROUND OF THE INVENTION

1. Field of the Invention

This invention relates to energy accumulators of the flywheel type, and more particularly to a flywheel assembly particularly useful in propelling personal transportation vehicles powered by internal combustion or thermal engines.

2. Brief Description of the Prior Art

It is well known that a rotating flywheel is capable of storing relatively large amounts of energy. The energy can be stored over a period of time, but can be quickly removed for supplying peak demands of energy. These concepts have been employed to propel electrically powered vehicles where the electric motive means is generally incapable of supplying the vehicle's peak power requirements, and to store excess energy. The problems inherent in electric motor and flywheel powered vehicles are significant, and as a result, these vehicles have experienced relatively minor acceptance. Certainly electric motor and flywheel powered vehicles have not supplied the majority of transporation needs of society.

Contemporary flywheel technology involves relatively comples considerations relating to materials and operating conditions. Developments in flywheel configurations have tended toward very heavy peripheral rings for concentrating and increasing energy storage. These configurations have required special materials for construction of the flywheel, since centrifugal forces in a rapidly rotating flywheel can easily exceed the safe tensile strength of conventional materials. Exceeding the safe tensile strength would, of course, result in a potential for shattering or disintegration of the rapidly spinning flywheel. Other contemporary flywheel technology has involved relatively light weight flywheels constructed of special materials designed to operate at extremely high rotational speeds. These materials are usually very expensive in cost, and the extremely high operational speeds require very intricate and expensive low friction bearings suitable for operating at such high speeds, such as magnetic suspension bearings, and special bearing lubrication systems.

Flywheels having significant energy accumulating capability have not been extensively used with internal combustion engines for propelling personal passenger transportation vehicles. This may be a result of using relatively large internal combustion engines which essentially render energy storage flywheels unnecessary. However, in modern society, excessive energy consumption and large amounts of air pollutant emissions from internal combustion engines in vehicles have reached such proportions that use of energy storage flywheels in vehicles powered by internal combustion engines is beneficial, as is more fully discussed in Low Energy Consumption Vehicle Powered By Thermal Engine, Ser. No. 786 547, now U.S. Pat. No. 4,131,171 filed on the same filing date herein by the same inventor.

A number of problems occur when an energy accumulating flywheel is adapted for use with an internal combustion engine powered passenger vehicle. The housing and bearings for supporting the spinning flywheel must have long life and be capable of surviving relatively large forces when the vehicle experiences rapid changes in stability, such as when traversing bumps or terrain changes. The bearings must withstand the operational speeds required to accumulate sufficient energy for powering the vehicle. At high operating speeds, adequate lubrication must be assured for the bearings.

Another problem in vehicle adaptions for a flywheel is that, in order to operate the flywheel at a relatively high rotational speed as much as twice the speed of the engine, a considerable amount of noise is generated if typical gear drive mechanisms are employed to rotate the flywheel. This noise is objectionable to the occupants of the vehicle.

A further requirement in adapting flywheels to vehicles is that the flywheel must be of a construction which allows safe operation at relatively high speeds, and must be configured to avoid extremely destructive relief of accumulated energy in the event of a vehicle crash or other inadvertence. The flywheel should be of a size which is readily adaptable and usable within the vehicle and which can be operated at rotational speeds which supply intermittent peak power requirements of the vehicle without problems. The configuration and operating conditions must not be allowed to cooperatively induce destructive harmonic forces in the flywheel.

Lastly, one requirement in utilizing a flywheel in an vehicle is that its construction should be relatively simple and should be achieved at relatively low cost, to secure consumer acceptance. For this reason, the flywheel assembly itself should be relatively simple, with a readily available supply of parts and materials. For these and other reasons, many prior art flywheels are too involved in construction or too excessive in cost, and are inapplicable as here contemplated.

SUMMARY OF THE INVENTION

In accordance with the present invention, there is provided an improved energy accumulator flywheel assembly readily adaptable for use in a vehicle powered by an internal combustion engine which achieves many beneficial results. The energy storage flywheel of the present invention utilizes a supporting arrangement for its bearings to adequately and beneficially suspend the spinning flywheel in a relatively unstable environment such as that of the personal transportation vehicle. A highly effective but economical lubrication system assures adequate lubrication for the bearings. The flywheel assembly is of optimum size and configuration for use in the vehicle at safe operating speeds, and the flywheel assembly can be easily used. Further, the configuration of the present invention is of a character to allow simple and economical construction.

A preferred embodiment of the present invention generally comprises a flywheel having the shape of a disc, an elongated center axle shaft attached to the flywheel at the axis of rotation, a cage means for essentially receiving the flywheel within its interior, and bearing means operatively connected between the center shaft and the cage means for supporting the center shaft and flywheel for rotation and for limiting axial and radial movement of the center shaft and flywheel. Bearing block means support the bearing means at each axial end of the center shaft. As a result, the flywheel is beneficially suspended to prevent adverse effects from spurious forces external to the flywheel assembly. The bearing block means includes a plurality of lubricant reservoirs and lubricant conducting passages for assuring adequate lubrication to the bearing means. The cage means comprises an outer concentric side wall plate radially spaced adjacent to the flywheel for the purpose of rapidly absorbing the energy of the spinning flywheel should a distortion or shattering of the flywheel occur. The side wall plate is retained within the cage means of the flywheel assembly by a lip externally circumjacent to the cylindrical side walls to restrain the side walls from expanding outward upon an inadvertant flywheel disintegration, thereby assuring a further measure of safety. When utilized in conjunction with a vehicle powered by an internal combustion engine, the cage means of the flywheel includes means for operatively connecting the interior of the cage with an intake manifold or other air intake means to at least partially evacuate the interior of the cage, thereby increasing the ability of the rotating flywheel to accumulate and maintain kinetic energy.

A more complete understanding and appreciation of the present invention, as well as further objects and advantages, may be obtained by reference to the following brief description of the drawings, detailed description of a preferred embodiment, and the appended claims.

BRIEF DESCRIPTION OF THE DRAWINGS

FIG. 1 is a side elevational view taken through a vertical section of apparatus of the present invention.

FIG. 2 is a top section view of reduced size taken substantially in the plane of line 2—2 of FIG. 1.

FIG. 3 is an enlarged top sectional view taken substantially in the plane of line 3—3 of FIG. 1.

FIG. 4 is a sectional view taken substantially in the plane of line 4—4 of FIG. 3.

FIG. 5 is a section view taken substantially in the plane of line 5—5 of FIG. 3 with certain elements removed and portions of other elements added for clarity.

DESCRIPTION OF PREFERRED EMBODIMENTS

Figure 6:
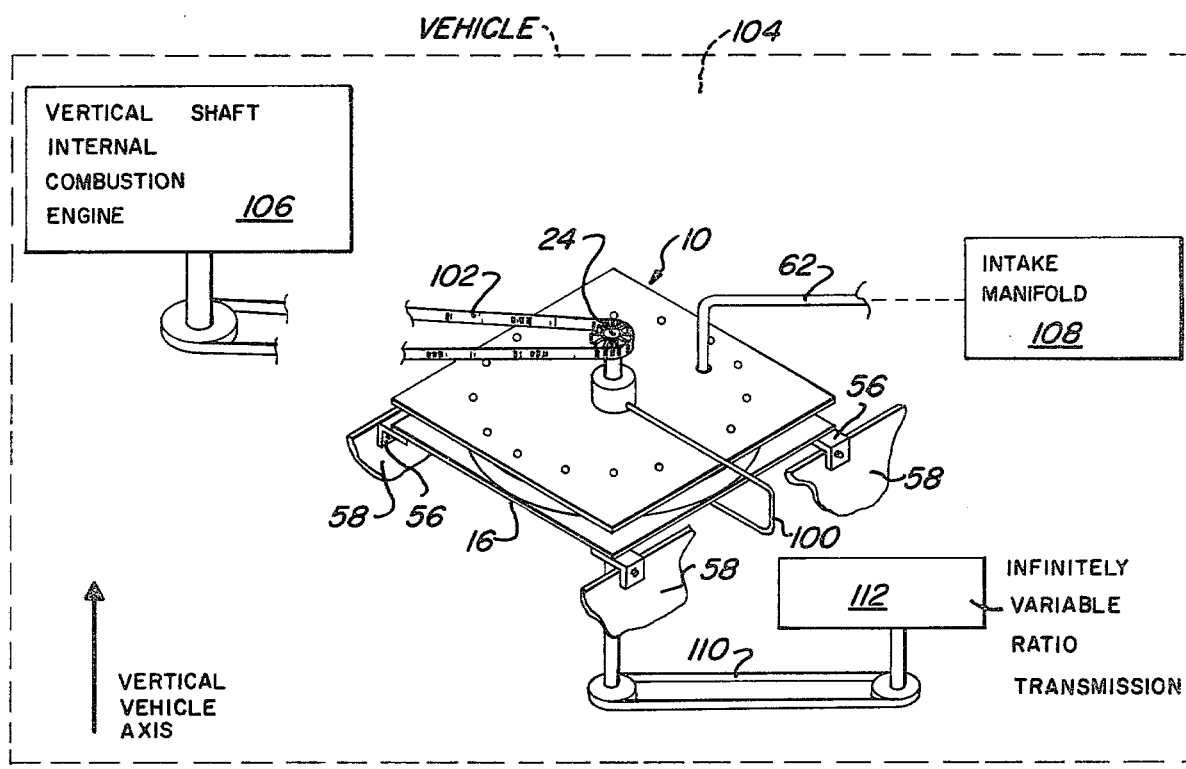
FIG. 6 is a schematic perspective view of the present invention illustrated for use in a vehicle powered by an internal combustion engine.

An improved flywheel assembly or apparatus 10 according to the present invention may be generally seen in FIGS. 1 and 2 to comprise a flywheel 12 operatively connected to a center axle shaft 14. The flywheel 12 is positioned for rotation within a hollow cage or housing 16. Bearing support blocks 18 are connected to the housing 16 and receive roller bearings 20 and axial thrust bearings 22 to position and support each axial end of the center shaft 14 so the flywheel 12 will rotate freely within the interior of cage 16. Sprockets 24 are connected axially external of each bearing support block 18 on the center shaft 14 for the purpose of transmitting energy to and from the rotating flywheel 12.

The flywheel 12 is formed in the shape of a disc having a smooth cylindrically shaped aperture 26 formed through its center for receiving the center shaft 14. Four apertures 28 for receiving bolts 30 connect the flywheel to the center shaft 14. The flywheel 12 is of uniform thickness and mass density with the top radially-extending surface 32 parallel to the bottom radially extending surface 34. The flywheel 12 further includes an outside circular surface 35 of uniform diameter, and the flywheel is dynamically balanced for rotation. The weight or mass of the flywheel 12 is directly related to the amount of energy that it will accumulate and store when rotated. The amount of energy necessary for use under varying different conditions can be readily determined, and the weight of the flywheel 12 is adjusted accordingly by varying the thickness, the diameter or mass density. It is preferable to limit the outside diameter of the flywheel 12 to more than eighteen inches when used in a vehicle, since this size will readily fit within the engine compartment of most conventional vehicles.

The material from which the flywheel is formed should have a tensile strength greater than that force created by rotation at its maximum intended rotational speed while allowing for a certain safety factor. One suitable material is conventional structural steel having a tensile strength of 115,000 p.s.i., which is suitable for maximum rotational speeds less than approximately 10,000 RPM. Structural steel can be obtained in varying thicknesses, and if necessary, more than one disc constructed in the manner described may be utilized by placing the plurality of discs in parallel and connecting them to the center shaft 14 by the bolts 30. The structural steel may be obtained in a Blanchard ground condition, or should be formed with the top and bottom surfaces 32 and 34 respectively parallel to one another. By this arrangement, the flywheel 12 is formed of readily obtainable materials at relatively low cost.

The center shaft 14 is formed with a radially extending flange 36 generally at its central portion for the purpose of receiving the threaded bolts 30 to connect the flywheel 12 to the shaft 14. Extending axially in each direction from the flange 36 are uniform diameter shaft portions 38. Extending axially from each portion 38 to an outer axial end of the shaft 14 are reduced diameter outer portions 40. A radially extending shoulder 42 separates portions 38 and 40. The shaft portion 38 radially contacts the roller bearings 20, and the shoulders 42 axially contacts the thrust bearings 22 with the shaft portions 40 received in the center opening of the thrust bearings 22.

The cage or housing 16 is formed by an upper cage plate 44, lower cage plate 46 and a cylindrically-shaped wide wall ring or plate 48. For anchoring the side plate 48 in continuous extending relation between the upper and lower cage plates 44 and 46 respectively, circular slots 50 are formed in plates 44 and 46 concentrically with the flywheel and center shaft axis of rotation to receive the edges of the side plate 48. In assembled relation, the plates 44, 46 and 48 are held together by bolts 52 extending between the upper and lower cage plates through apertures 53 formed in the side plate 48 and by nuts 54 threaded onto the bolts 52. A plurality of bolts 50, apertures 53 and nuts 54 are provided in equally circumferentially spaced relation around side plate 48. Apertures 51 in the center of plates 44 and 46 insure that the bolts 30 and the flange 36 do not contact plates 44 and 46 when the flywheel 12 rotates.

The cylindrically shaped side plate 48 is circumjacently spaced a short distance from the periphery of the flywheel 12 to quickly absorb energy from the flywheel should it begin to shatter or distort from some unforeseen inadvertence. Material from the shattering flywheel would virtually instantaneously contact the side plate 48 which acts as a brake to absorb energy, slow the flywheel and avoid uninhibited disintegration. By placing the side plate 48 within the slots 50, further protection in case of flywheel disintegration is achieved. The lip material at 55 in the upper and lower cage plates anchors the side plate 48 completely around its circumference against radially outward movement. The material 55 supplies additional strength for containing a shattering flywheel that use of the bolts 52 without the slots 50 would not secure, since the bolts without the slots could be sheared by flywheel disintegration.

The slots 50 for receiving the side plate 48 also help create an air tight seal between the interior and exterior environment of the flywheel cage 16. This air tight seal allows evacuation of the interior of the flywheel cage 16 to reduce air drag or friction on the rotating flywheel and increase the rotational efficiency for accumulating and storing energy. The side plate 48 may be sealed within the slots 50 by use of a conventional plastic sealing or gasket material.

For the purpose of attaching the flywheel assembly 10 in a conventional vehicle powered by an internal combustion or thermal engine, brackets 56 may be provided. Some of the bolts 52 connect one portion of the brackets 56 to the flywheel cage 16 and the other portion of the brackets is connected in a conventional manner to the vehicle, a portion of which is illustrated at 58.

For the purpose of connecting the interior of the flywheel cage 16 to the source of vacuum such as the intake manifold of an internal combustion engine, there is provided a nipple or conduit 62 through one of the cage plates, for example the upper cage plate 44. A hose is connected from the conduit 62 to a port in the intake manifold of the engine, thereby creating a partial vacuum within the interior of the flywheel cage 16 by operation of the engine. This arrangement is more fully described in the aforementioned Low Energy Consumption Vehicle Powered by Thermal Engine, Ser. No. 786,547, now U.S. Pat. No. 4,131,171 by the inventors herein.

The two bearing support blocks 18 are of the same construction, and each can be better understood by reference to FIGS. 1, 3, 4 and 5. Each bearing support block 18 is formed from a single piece of suitable material such as steel. One block 18 is attached to each of the cage plates 44 and 46 by bolts 64 inserted through axially extending holes 66 in the blocks 18.

Three openings 68, 70 and 72, each coaxial with the center shaft 14, are formed in the bearing support blocks 18, as is best seen in FIG. 4. The opening 68 is of slightly larger diameter than the reduced diameter portion 40 of the shaft 14. The opening 70 is provided for receiving the axial thrust bearing 22, which is conventional construction having an axially inner raceway 22a and an axially outer raceway 22b separated by a plurality of radially extending needle rollers 22c. The raceway 22a is seated against the shoulder 42 of the center shaft 14, and the raceway 22b is seated on a radially extending shoulder 74 of the bearing block separating the coaxial openings 68 and 70. The roller bearing 20 is received within the opening 72 coaxially with the shaft portion 38. The roller bearing 20 is of conventional construction employing a radially inner raceway 20a, radially outer raceway 22b, and a plurality of axially extending roller bearings 20c separating the raceways 20a and 20b. The roller bearing 20 is maintained in position in the opening 72 by a keeper 76 received within a slot 78 and a radially extending shoulder 77 separating coaxial openings 70 and 72.

A lubricant seal assembly 80 is provided in each bearing block 18 adjacent the portion 38 of shaft 14. The seal assembly 80 is received within a coaxial opening in a seal positioning disc 82 which itself is received with an annular opening 84 in the bearing block 18. At the opposite axial end of the bearing support block 18 another lubricant seal assembly 86 is provided adjacent the portion 40 of the shaft 14. The lubricant seal 86 is received within an annular opening 88 formed in the bearing block 18.

For the purpose of providing lubricant to the bearings 20 and 22 and to the shaft portion 40 in the opening 68, a plurality of lubricant passages are drilled or otherwise formed in the bearing support block 18 as is best shown in FIGS. 1, 3 and 5. The lubricant passages comprise four axially extending and circumferentially equally spaced reservoir passages 90 and a plurality of radially extending lubricant conducting passages 92, 94 and 96. The passages 92, 94 and 96 extend from each of the reservoir passages 90 into the coaxial openings 68, 70 and 72, respectively. In this manner, passages 92 supply lubricant from passages 90 to the space between opening 68 and shaft portion 40 and to the lubricant seal 86 (FIG. 4). The passages 94 supply lubricant from the passages 90 to the thrust bearing 22 received within opening 70. The passages 96 supply lubricant from the passages 90 to the roller bearing 20 received in opening 72 and to the lubricant seal 80 (FIG. 4). The exterior ends of the lubricant passages 90, 92, 94 and 96 are sealed as with threaded plugs 98. One end of the lubricant passages 90 is sealed against the cage plates 44 and 46 with a plastic sealing or gasket material when the bearing support blocks 18 are firmly attached to plates 44 and 46 with the bolts 64.

The lubricant passages 90, 92, 94 and 96 form a reservoir for the lubricant to insure that the bearings and shaft of the present invention receive sufficient lubricant. A tubing 100, shown in FIGS. 1 and 5, connects the reservoirs of the two bearing support blocks 18 of the flywheel assembly 10 to conduct lubricant between the reservoirs of each block 18. In this manner, a relatively simple gravity lubrication system is provided. One of the uppermost plugs 98 may be removed to add lubricant to the reservoirs of both support blocks 18, or the tubing 100 can be connected to a filling device (not shown).

Energy and power is delivered to and received from the rotating flywheel 12 by means of a nylon and urethane cable chain 102 fitting over the sprockets 24, shown in FIG. 6. As is described more fully in the aforementioned Low Energy Consumption Vehicle Powered by Thermal Engine, filed by the same inventor, the cable chain and sprocket drive avoid objectionable noise prevalent with conventional mechanical gear drives and does not require lubrication.

One contemplated use of the present invention is seen in FIG. 6 which schematically illustrates use of the flywheel assembly 10 in a vehicle 104. The flywheel assembly 10 is attached by brackets 56 in the vehicle 104. A vertical shaft internal combustion engine 106 is also attached to the vehicle 104, and power from the engine 106 is supplied through the nylon and urethane cable chain 102 to the top sprocket 24 of the flywheel assembly. The flywheel assembly 10 is oriented with its rotational axis in a vertical configuration within the vehicle 104 so the gyroscopic effect from the flywheel will have no significant adverse affect on the maneuverability of the vehicle. The conduit 62 connected in the flywheel cage 16 is connected with an intake manifold 108 of the engine 106 to evacuate the interior of the flywheel cage. Another nylon and urethane cable chain 110 connects the bottom sprocket of the flywheel assembly 10 to an infinitely variable ratio transmission 112. Output power from the transmission 112 is utilized to propel the vehicle 104.

By utilization of the present invention with an internal combustion engine in a personal transportation vehicle, the energy accumulated by the rotating flywheel over a period of time can be utilized during intermittent peak power requirements such as in acceleration, passing, and hill climbing, etc.

Figure 7:
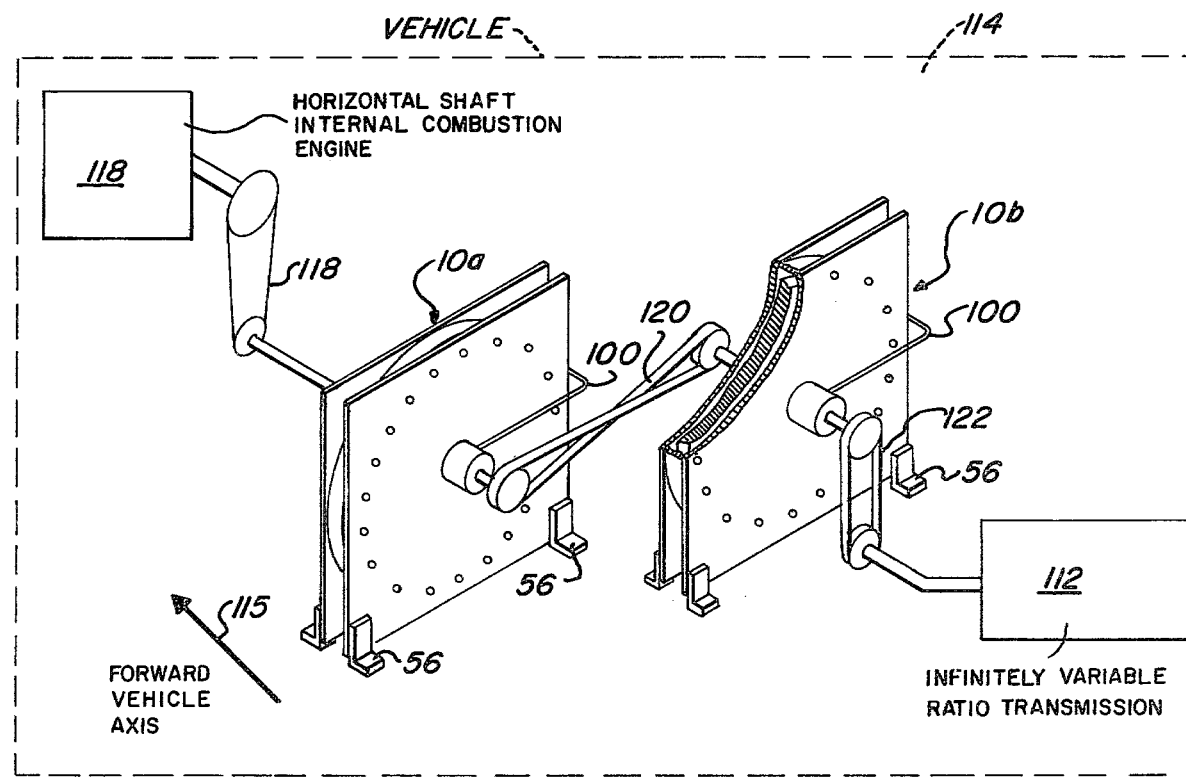
FIG. 7 is a schematic perspective view of two apparatus of the present invention operatively connected together in another mode of use in a vehicle powered by an internal combustion engine.

The flywheel assembly of the present invention may also be utilized in a vehicle 114 with its rotational axis oriented horizontally and parallel to the longitudinal forward axis 115 of the vehicle 114, as is shown in FIG. 7. In this arrangement, two flywheel assemblies 10a and 10b are employed, and the flywheels of each assembly are operatively connected rotate in opposite directions, thereby cancelling the gyroscopic effect created by each flywheel individually. Arranged in this manner, the maneuverability of the vehicle is not adversely affected. In FIG. 7, the brackets 56 position the flywheel assemblies 10a and 10b with their center shafts horizontal and longitudinally aligned along the longitudinal axis 115 of the vehicle 114. A horizontal shaft internal combustion engine 118 is connected to the flywheel assembly 10a by a first nylon and urethane cable chain 118. A second nylon and urethane cable chain 120, formed in the shape of a figure-eight, connects the sprockets of the flywheel assemblies 10a and 10b. Forming the cable chain 120 in the shape of a figure-eight causes one flywheel to rotate in the opposite direction of the other flywheel. The figure-eight nylon and urethane cable chain drive is more fully disclosed in the aforementioned Low Energy Consumption Vehicle Powered by Thermal Engine. Output energy from the interconnected flywheels is supplied to the infinitely variable ratio transmission 112 from another nylon and urethane cable chain drive 122.

From the foregoing description it is apparent that the conventional roller and thrust bearings 20 and 22, respectively, are effectively utilized in a relatively convenient manner to adequately support the flywheel 12 of the assembly 10 when positioned in desired orientation. Lubricant is supplied to the bearings from the reservoirs and passages in the bearing support blocks 18, and the lubricant may be conveniently replenished if necessary. Thus, the concise construction of the bearings support blocks and lubricant reservoirs allows use of conventional bearings to avoid the high cost of unconventional bearings utilized in advanced flywheel technology, and further avoids the necessity for special lubricants and lubricant systems or mistors also employed in advanced flywheel technology. By utilization of the present flywheel assembly in conjunction with an internal combustion engine, a convenient source of vacuum is supplied by the intake manifold of the engine for evacuating the flywheel housing, making the flywheel more efficient in storing and accumulating energy. The arrangement of cylindrical side plate 48 around the flywheel 12 and the slots 50 in the upper and lower cage plates for receiving and maintaining the side plate of the flywheel cage secures desirable safety features should an inadvertent disintegration of the flywheel occur. The flywheel itself is of relatively simple construction and utilizes no keyways or notches which might weaken the strength of flywheel material to induce shattering, disintegration or other inadvertant fault. The nylon and urethane cable chain and sprocket drive system for supplying energy to the flywheel and removing energy from the flywheel avoids objectionable noise prevelant in high speed operation, avoids the high cost of special lapped and ground mechanical gears and does not require lubrication.

A preferred embodiment of the present invention has been described with a degree of particularity to enable a full and complete understanding of that embodiment. It should be understood, however, that the scope of the present invention is defined by the following claims, which are intended to encompass a scope of the invention to the extent that the prior art allows.

What is claimed is:

1. A flywheel assembly, comprising:
   a flywheel generally having the shape of a disc of uniform thickness with two parallel radially extending surfaces and a peripheral outside surface of uniform diameter, said flywheel further having an axis of rotation and a center aperture formed through said flywheel coaxially with the axis of rotation;
   an elongated center axle shaft received within the center aperture of said flywheel and extending coaxially with the axis of rotation, said center shaft generally having two opposed axial end portions;
   connecting means associated with said flywheel and said center shaft for rigidly connecting said flywheel to said center shaft at a position intermediate the shaft end portions;
   cage means of generally hollow interior configuration for receiving the flywheel within the interior thereof with the end portions of said center shaft extending therefrom, said cage means comprising a pair of flat plate members, one plate member positioned on each axial side of said flywheel, and a separate cylindrically shaped ring, and means for rigidly fastening said ring intermediate said plate members with said ring extending continuously between said plate members in next circumjacent and concentric relation with the outside peripheral surface of said flywheel;
   a radial bearing assembly operatively connected to each axial end of said center shaft for supporting each axial end portion of said center shaft for rotation;
   a thrust bearing assembly operatively connected to each axial end of said center shaft for supporting each end portion to limit axial movement of said center shaft;
   a pair of bearing block members operatively attached to said cage means for supporting said bearing assemblies to allow free rotation of said flywheel within said cage means, each bearing block member being attached to one plate member to operatively support one radial and one thrust bearing assembly at each axial end of said center shaft, each bearing block member having at least one opening formed therein for receiving at least one bearing assembly; and
   means associated with said bearing block means for supplying lubricant to each opening in said bearing block member and to each bearing assembly received within each opening.

2. A flywheel assembly as recited in claim 1 wherein:
   each end portion of said center shaft includes a large diameter portion and a small diameter portion, the large and small diameter portions being separated by a radially extending shoulder;

each said bearing block member comprises at least two openings, each generally coaxial with said center shaft, the first opening being radially adjacent and separated from the large diameter shaft portion, and the second opening being radially adjacent and separated from the small diameter shaft portion;

said radial bearing assembly being positioned within the first opening of said bearing block member; and said axial thrust bearing assembly being positioned within the second opening of said bearing block member.

3. A flywheel assembly as recited in claim 2 wherein said means for supplying lubricant comprises:

at least one lubricant reservoir passage, and at least one lubricant conducting passage communicating from said reservoir passage to each of the first and second openings in said bearing block member.

4. A flywheel assembly as recited in claim 3 further comprising:

means interconnecting each lubricant reservoir passage for conducting lubricant therebetween.

5. A flywheel assembly as recited in claim 4 wherein:

each said bearing block member comprises a third opening generally coaxial with said center shaft, the third opening being generally next adjacent to the small diameter portion of the center shaft, said bearing block member further comprising a radially-extending shoulder intermediate the second and third openings and axially separated from the shoulder on said center shaft separating the large and small diameter portions; and said axial thrust bearing assembly simultaneously axially abuts the shoulder of said center shaft and the shoulder intermediate the second and third openings of said bearing block means.

6. A flywheel assembly as recited in claim 5 further comprising:

at least one lubricant conducting passage communicating from said reservoir passage to the third opening in said bearing block member.

7. An invention as recited in claim 1 further comprising, in combination:

a vehicle;

a thermal engine positioned within said vehicle;

means for positioning said flywheel assembly within said vehicle; and means for conducting energy between said thermal engine and said flywheel assembly, said conducting means being operatively connecting with said center axle shaft.

8. An improved safety cage for an energy accumulator assembly of the type having a generally cylindrical flywheel of uniform diameter positioned for rotation therein, comprising:

a pair of cage plate members extending generally transversely of the axis of rotation of said flywheel on each side of said flywheel, a single integrally and separably formed side plate member having a shape essentially of a hollow tubular cylinder, said side plate member positioned intermediate said cage plate members and concentrically with said flywheel and in radially spaced circumjacent and next adjacent relation with said flywheel, said side plate member extending continuously between said cage plate members, and;

lip means integral with each of said cage plate members radially exterior of said side plate member for circumjacently abutting the exterior surface of said side plate member.

9. An improved safety cage as defined in claim 8, further comprising:

slot means formed annularly in each of said cage plate members for receiving an edge of said side plate members.

10. An improved safety cage as defined in claim 9 wherein:

each of said cage plate members comprises an annular slot formed therein, the slots being of size to receive said cylindrically shaped side plate member therein with the outer cylindrical surface of said side plate member circumjacently abutting a cylindrical lip defined in said plate members by said annular slots.

11. An improved safety cage as recited in claim 10 further comprising:

fastening means extending between said cage plate members for fastening said side plate member within said slots.

12. An improved safety cage as recited in claim 11 further comprising:

a plurality of axially extending apertures formed through said side plate members and said cage plate members to receive said fastening means.

* * * * *